United States Patent
Ishii

(10) Patent No.: US 6,330,109 B1
(45) Date of Patent: Dec. 11, 2001

(54) OPTICAL SYSTEM COMPRISING A DIFFRACTIVE OPTICAL ELEMENT, AND METHOD OF DESIGNING THE SAME

(75) Inventor: Tetsuya Ishii, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/840,867

(22) Filed: Apr. 25, 2001

Related U.S. Application Data

(62) Division of application No. 09/291,180, filed on Apr. 14, 1999.

(30) Foreign Application Priority Data

May 13, 1998 (JP) .................................................. 10-130105

(51) Int. Cl.⁷ .............................. G02B 5/18; G02B 27/44
(52) U.S. Cl. .......................... 359/571; 359/566; 359/569
(58) Field of Search ..................................... 359/566, 569, 359/571, 576

(56) References Cited

U.S. PATENT DOCUMENTS

| | | | |
|---|---|---|---|
| 5,080,465 | 1/1992 | Laude | 359/571 |
| 5,589,983 | 12/1996 | Meyers et al. | 359/566 |
| 5,629,799 | * 5/1997 | Maruyama et al. | 359/566 |
| 6,067,197 | 5/2000 | Blasiak et al. | 359/571 |

FOREIGN PATENT DOCUMENTS

03191319 A * 8/1991 (JP) ....................................... 359/569

OTHER PUBLICATIONS

"Scalar Theory of Transmission Relief Gratings"—Optics Communications, E.K. Popov, L.V. Tsonev & E.G. Loewen, vol. 80, No. 5, 6—Jan. 15, 1991.

* cited by examiner

Primary Examiner—Audrey Chang
Assistant Examiner—Jennifer Winstedt
(74) Attorney, Agent, or Firm—Pillsbury Winthrop LLP

(57) ABSTRACT

The invention relates to a method of easily and quantitatively determining the diffraction efficiency of a relief type diffraction optical element, and provides a method of designing an optical system comprising a diffractive optical element using diffraction efficiency as at least one estimation index. The diffractive optical element is a transmission blaze grating constructed of a relief having a sawtooth shape in section. The transmission blaze grating having a side wall substantially vertical to a grating surface. The estimation index is given by a predetermined mathematical expression including at least a phase difference due to a relief discontinuity and shadow effects thereof. The mathematical expression includes as the shadow effects of said discontinuity at least a light attenuation effect dependent on an angle-of-incidence and a light attenuation effect independent on the angle-of incidence in a separate manner.

2 Claims, 9 Drawing Sheets

$\theta_{en}$: Angle of incidence, $\theta_{ex}^{(m)}$: m-order angle of diffraction $n_{en}$: Refractive index of entrance side, $n_{ex}$: Refractive index of exit side h : Grating depth, p : Grating pitch $\theta_b$ : Blaze angle $$\tan\theta_b = \frac{h}{p}$$

$$n_{ex}\sin\theta_{ex}^{(m)} = n_{en}\sin\theta_{en} + \frac{m\lambda}{p}$$

OPTICAL SYSTEM COMPRISING A DIFFRACTIVE OPTICAL ELEMENT, AND METHOD OF DESIGNING THE SAME

This is a Divisional of National Application No. 09/291,180 filed Apr. 14, 1999.

BACKGROUND OF THE INVENTION

The present invention relates generally to a relief type diffraction optical element of sawtooth shape in section, an optical system comprising a relief type diffraction optical element and a method of designing the optical system, and more particularly to a relief type diffraction optical element having a lens action.

A lens (diffractive lens) bending light by diffraction has a unique yet useful feature different from the feature of a refractive lens. For instance, it is possible to achieve an achromatic optical system by making use of a diffractive lens having dispersions (inverse and anomalous dispersions) different from those of a refractive lens, and reduce the size and weight of an optical system by making use of the feature of the diffractive lens that has substantially no thickness. Such a diffractive lens can be fabricated in the form of a relief type diffractive element by use of recent micromachining technologies. Recently, applications with an actually mounted diffractive lens have been put to practical use. Thus, diffractive lenses have already been at the commercial stage.

However, a diffractive optical element represented by a diffractive lens has a unique property called diffraction efficiency that is not found a refractive element. In some cases, this property is a deterrent to the application of a diffractive lens to a phototaking optical element. One example of that property is the angle-of-incidence dependence of diffraction efficiency. Even though a diffractive optical element is constructed in such a manner that sufficient diffraction efficiency is obtainable at a specific angle of incidence, the diffraction efficiency often drops with a change in the angle of incidence—a phenomenon called the angle-of-incidence dependence of diffraction efficiency. In principle, this problem is inherent to every diffractive optical element. Given an actual diffractive optical element, this problem arises necessarily to one degree or another.

A lowering of diffraction efficiency with respect to major orders of light is tantamount to an increase in other orders of light (unnecessary light). Such unnecessary light takes the form of ghosts or flares, causing a deterioration in the performance of an optical system. Even when a diffractive lens is used in a photodetection optical system such as a pickup lens, it is therefore desired to achieve at least 60% diffraction efficiency. Especially when the diffractive lens is used in an image formation optical system to form images, at least 80% diffraction efficiency is needed so as to keep a minimum of image quality. To achieve high-definition image quality, at least 90% diffraction efficiency, or at least 95% diffraction efficiency in some cases, is needed.

In some cases, grooves in a relief type diffractive optical element, for instance, are made flat by use of a transparent optical material. The diffractive optical element of such construction is characterized by being resistant to extraneous contamination because the fine structure of a relief pattern is protected, and so enables such optical design as to expose a relief pattern surface substantially to the outside. This technique is very effective to put a diffractive optical element to practical use. However, this construction may possibly make the angle-of-incidence dependence of diffraction efficiency worse than that of an ordinary relief grating. Therefore, when this construction is applied to an actual optical system, it is very important to pay quantitative attention to the angle-of-incidence dependence of diffraction efficiency.

To apply a diffractive optical element to an optical system for practical purposes, it is then inevitable to pay quantitative attention to the angle-of-incidence dependence of diffraction efficiency. In such an ordinary method of designing a diffractive lens as represented by an ultrahigh index method (Sweatt Model) wherein a diffractive optical element is substituted by a virtual refractive lens, however, whether the diffractive optical element is a relief grating or a volume hologram is not designated at the design stage. The angle-of-incidence dependence of diffraction efficiency varies for each embodiment of the diffractive optical element. In other words, such a design method cannot achieve design with the angle-of-incidence dependence of diffraction efficiency in mind. Even though an optical system comprising a diffractive optical element is constructed according to such design, the optical properties as designed would often be unexpectable.

As one means for providing quantitative analysis of the angle-of-incidence dependence of diffraction efficiency in a relief type diffractive optical element, electric field analysis based on Maxwell's equations is generally available. Electric field analysis based on Maxwell's equations may make it possible to have a quantitative understanding of the angle-of-incidence dependence of diffraction efficiency. When this method is used, however, it is not easy to obtain the results of calculation, because a solution of a differential equation should be found for each specific state (the wavelength of light used, grating pitch, groove depth, refractive index, and so on). To obtain a solution of the differential equation, approximately P×P matrix calculations are needed at a pitch P standardized with wavelength. At a pitch level (usually 20 or more pitches standardized with wavelength) often used for a diffractive lens in an image formation optical system, it is very difficult to obtain the results of calculation. Thus, it is impractical to perform such analysis parallel with lens design.

As another means for estimating the diffraction efficiency of a relief type diffractive element, a method of applying a thin diffraction grating model (thin model) to Scalar diffraction formula is available. This method has a feature of making it possible to easily obtain the results of calculation, because the diffraction efficiency of the relief type diffractive element is described by a formulated (so-called closed form of) expression. However, the method based on such a thin model is little applied to the estimation of the angle-of-incidence dependence of diffraction efficiency that is one specific object of the invention, because no care is generally taken of the influence of oblique incidence. In a model obtained by extension of the thin model (E. K. Popov et al., Opt. Commun. 80, (1991) 307), care is taken of the oblique incidence feature of the relief grating. This model, too, is not sufficient in terms of quantitative accuracy with which diffraction efficiency is quantitatively estimated as contemplated in the invention. Especially when grooves in the relief type diffractive optical element are made flat with a transparent optical material, the results obtained in this method are in no quantitative coincidence with the results of stringent calculation based on electric field analysis at all.

As explained above, any method of making quantitative estimation of the diffraction efficiency of a relief type diffractive optical element including its angle-of-incidence dependence in an easy manner has not been established in the prior art. For this reason, little care is taken of the angle-of-incidence dependence of diffraction efficiency of an optical system at the design stage; there is a large significant difference between the optical performance and the design performance of an actually constructed optical system.

SUMMARY OF THE INVENTION

In view of such problems associated with the prior art, one object of the present invention is to provide a method of quantitatively deriving the diffraction efficiency of a relief type diffractive optical element including its angle-of-incidence dependence in a simple manner. Another object of the present invention is to clarify the relationship between the condition for constructing a blaze grating important to an optical system and the angle of incidence of light thereon, thereby providing a high-performance optical system on the basis of the resulting effective relationship.

According to one aspect of the invention, the above objects are achieved by the provision of a method of designing an optical system comprising a diffractive optical element using diffraction efficiency as at least one estimation index, characterized in that:

said diffractive optical element is a transmission blaze grating constructed of a relief having a sawtooth shape in section, said transmission blaze grating having a side wall substantially vertical to a grating surface thereof, and said estimation index is given by a predetermined mathematical expression including at least a phase difference due to a relief discontinuity and shadow effects thereof, said mathematical expression including as the shadow effects of said discontinuity at least a light attenuation effect dependent on an angle-of-incidence and a light attenuation effect independent on said angle-of-incidence in a separate manner.

According to another aspect of the invention, there is provided an optical system comprising at least one diffractive optical element on an optical axis thereof, characterized in that:

said diffractive optical element is a transmission blaze grating constructed of a relief having a sawtooth shape in section, said transmission blaze grating having a side wall substantially vertical to a grating surface thereof, and said optical system comprises said optical axis and at least one entrance surface vertical to a grating groove, wherein an angle $\theta_{en}$ of an incident light ray with a normal to said grating groove on said entrance surface and a construction of said blaze grating in a region of said grating surface on which said incident light is incident satisfies the following relationship with respect all light rays on said entrance surface upon incidence on said diffractive optical element:

$$1 \geq PSE \times SE > 0.8$$

where $$PSE = |\sin \pi(m-\phi)/\{\pi(m-\phi)\}|^2$$

$$\phi = h/\lambda \cdot (n_{ex} \cos \theta_{ex}^{(m)} - n_{en} \cos \theta_{en})$$

$$n_{ex} \sin \theta_{ex}^{(m)} = n_{en} \sin \theta_{en} + m\lambda/p$$

$$SE = \{1 - \sqrt{(SE1^2 + SE2^2)}\}^2$$

$$SE1 = k_1 \cdot (h/p) \tan \theta_{ave}$$

$$SE2 = k_2 \cdot \lambda/p$$

$$\theta_{ave} = (\theta_{en} + \theta_{ex}^{(m)})/2$$

$$k_1 = 0.85$$

$$k_2 = 0.3 \cdot |h/\lambda|^{0.35}$$

wherein $n_{en}$ is a refractive index of an entrance side medium, $n_{ex}$ is a refractive index of an exit side medium, h is a grating groove depth, p is a grating pitch, m is an order of diffraction at which diffraction efficiency is maximized, $\theta_{ex}^{(m)}$ is an angle of an m-order diffracted light ray with the normal to the grating surface, and $\lambda$ is a wavelength of light used.

According to yet another aspect of the invention, there is provided an optical system, characterized by comprising a transmission blaze grating constructed of a relief having a sawtooth shape in section and satisfying the following relationships:

$$0.8 < |h/h_0| < 1$$

$$6 < |p/h_0|$$

where $h_0 = \lambda/(n_{ex} - n_{en})$, $\lambda$ is a wavelength of light used, $n_{en}$ is a refractive index of an entrance side medium, $n_{ex}$ is a refractive index of an exit side medium, h is a grating groove depth, and p is a grating pitch.

In the present invention, the estimation index is given by a predetermined mathematical expression including at least a phase difference due to relief discontinuities and shadow effects thereof. The mathematical expression includes as the shadow effects of the discontinuities at least a light attenuation effect dependent on an angle-of-incidence and a light attenuation effect independent on the angle-of incidence in a separate manner. It is thus possible to provide a quantitatively accurate calculation of the diffraction efficiency of a transmission blaze grating. By using this in combination with ray tracing, it is possible to improve the accuracy of optical design for achieving a diffractive optical element in the form of a transmission blaze grating and the efficiency of development thereof and, hence, develop a diffractive optical element-including optical system having ever higher performance than achieved in the prior art.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

To accomplish the above objects, the inventors come up with a method of applying an extended thin model to Scalar diffraction formula, i.e., a method of improving the above attempt made by E. K. Popov et al., thereby making calculation (approximate calculation) on an extended thin model basis coincide quantitatively with stringent numerical calculation on an electric field analysis basis. How to design a relief type diffractive optical element to achieve the first object of the invention will now be explained in detail.

Figure 1:
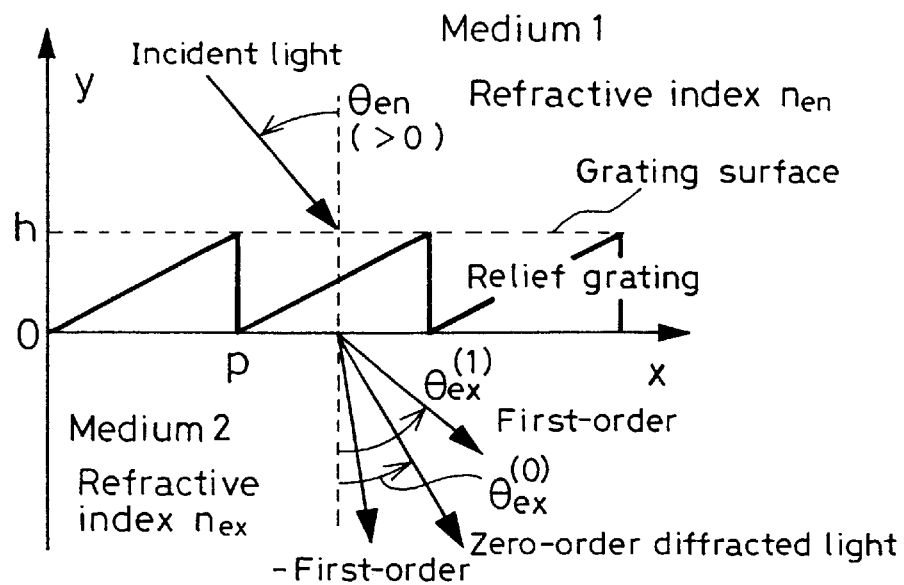
FIG. 1 is a schematic for defining the relationship between the configuration of a blaze grating used herein and a incident light ray.

The relationship between the configuration of a blaze grating used herein and an incident light ray is defined in FIG. 1. In FIG. 1, an x-y plane is assumed to lie on an entrance surface vertical to grating grooves and including an optical axis, an x-axis to be contiguous to a reference (grating) surface with a relief formed thereon, and a y-axis to be vertical to the x-axis at its point of contact. Here let the sign of each axis be positive in the direction of an arrow in FIG. 1. A thick line stands for a boundary between a medium 1 having a refractive index $n_{en}$ and a medium 2 having a refractive index $n_{ex}$, and defines a sectional shape of the blaze grating. As shown, the blaze grating has a sawtooth sectional shape having a side wall blaze vertical to the x-axis, i.e., vertical to the grating surface. The pitch is given by p, and the groove depth is given by h (tan $\theta_b$=h/p where $\theta_b$ is a blaze angle). It is here to be noted that when h is negative, light rays incident on the blaze grating are separated into plural orders of diffractive light. At this time, the relationship between the angle of incidence $\theta_{en}$ of the light ray on the x-y plane, i.e., the entrance surface and an m-order angle of diffraction $\theta_{ex}^{(m)}$ is defined by $$n_{ex} \sin \theta_{ex}^{(m)} = n_{en} \sin \theta_{en} + m\lambda/p \quad (1)$$

Here let the signs of the angle of incidence and the angle of diffraction be positive in the counterclockwise direction, and the sign of the order of diffraction be positive in the direction in which the angle of diffraction increases. Unless otherwise stated, the angle of incidence or the angle of diffraction is assumed to be determined on the x-y plane (entrance surface).

Among factors for determining the diffraction efficiency of such a blaze grating as shown in FIG. 1, the following factors are considered to be significant:

(1) effect of phase shift action by relief (PSE), (2) efficiency drop due to the shadow effects of a relief discontinuity (SE), and (3) drop of energy transmittance by surface reflection (FT). From these factors, it is possible to obtain an expression giving transmission m-order diffraction efficiency, as described below.

$$\eta_m = FT \times PSE \times SE \quad (2)$$

The inventors have built up a model for each factor, and made a quantitative comparison of the results of approximate calculation obtained from the expression with the results of stringent numerical calculation, and found that the models of the following constructions are preferable because of their simplicity and quantitatively precise coincidence. The construction of the model for each factor will now be explained.

(1) Effect of the Phase Shift Action by Relief (PSE)

Figure 2:
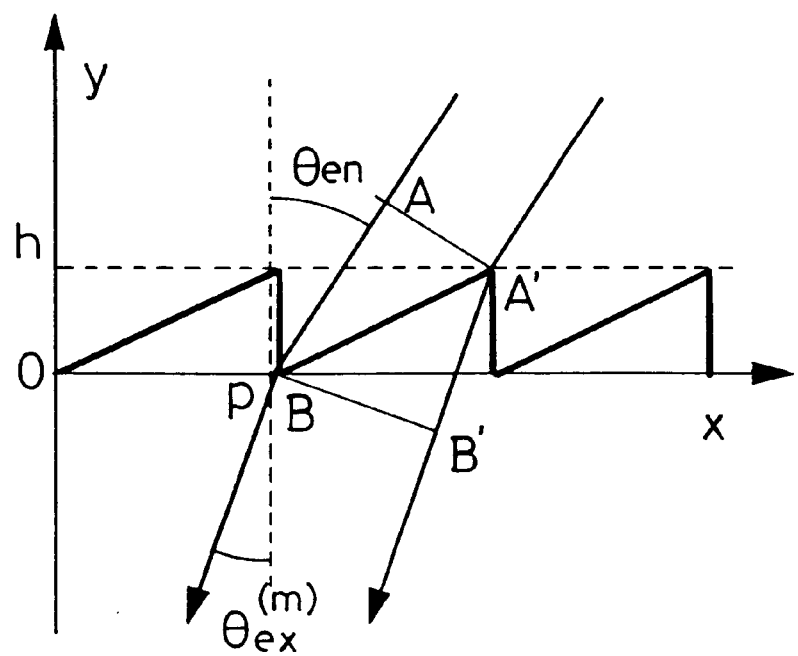
FIG. 2 is a schematic for illustrating the phase shift action of a relief grating.

A ray bundle incident on a relief grating at a certain angle of incidence $\theta_{en}$ leaves the relief grating at an angle of diffraction $\theta_{ex}^{(m)}$ of m-order diffracted light where m is an integer. On the basis of such a ray tracing assumption as shown in FIG. 2, the phase shift action φ of the relief grating (the amplitude of a phase shift function) is then given by a difference between two optical paths AB and A'B' shown in FIG. 2. Hence, $$\phi = h/\lambda \cdot (n_{ex} \cos \theta_{ex}^{(m)} - n_{en} \cos \theta_{en}) \quad (3)$$

By applying this result to an ordinary Scalar diffraction formula, the following expression can be obtained as the effect PSE of the phase shift action of a transmission blaze grating:

$$PSE = |\sin \pi(m-\phi)/\{\pi(m-\phi)\}|^2 \quad (4)$$

With this expression, it is possible to obtain an effective expression of the asymmetry of the angle-of-incidence of diffraction efficiency because the m-order diffracted light is assumed to be a ray leaving a relief slope.

(2) Drop of Efficiency Due to the Shadow Effects of a Relief Discontinuity (SE)

Figure 3:
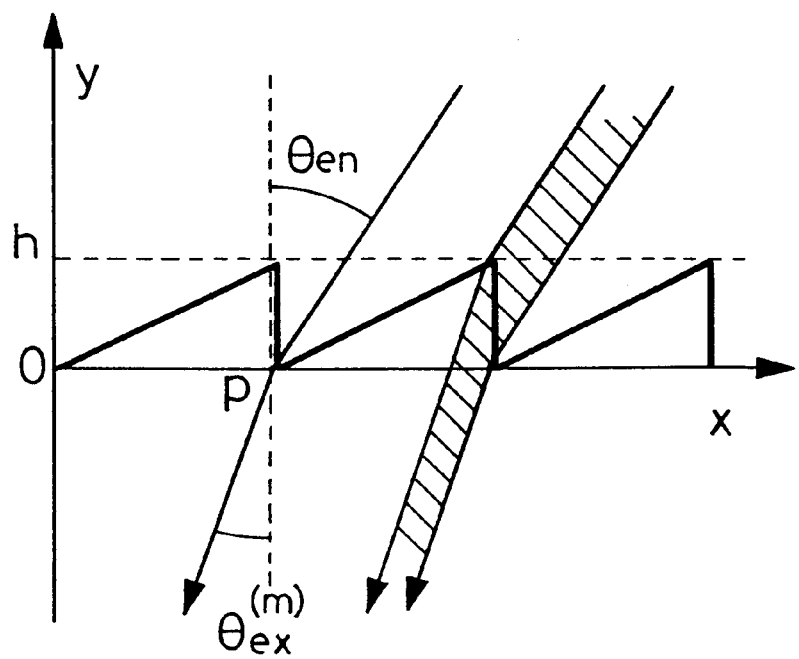
FIG. 3 is a schematic for illustrating the shadow effects of a relief discontinuity in the relief grating.

When light is incident on a blaze grating from an oblique direction, a part of the incident ray bundle is considered to be cut off by a relief discontinuity, as shown by a hatched region in FIG. 3. For such shadow action, independent hypotheses are set up about the geometrical shadow effect of the side wall of a grating groove, i.e., an effect SE1 dependend on the angle of incidence, and a light attenuation effect SE2 that is found in the vicinity of the boundary of discontinuities and is independent on the angle of incidence. Here these actions are expressed in the following forms:

$$SE1 = k_1 \cdot (h/p) \tan \theta_{ave} \quad (5)$$

$$SE2 = k_2 \cdot \lambda/p \quad (6)$$

where $\theta_{ave}$ is an average of the angle of incidence and the exit angle or $$\theta_{ave} = (\theta_{en} + \theta_{ex}^{(m)})/2 \quad (7)$$

and $k_1$ and $k_2$ are arbitrary correction coefficients introduced for quantitatively combining together the results of calculation. With expressions (5) to (7), the drop of efficiency by the shadow effect of relief discontinuities is herein expressed in the following form:

$$SE = \{1 - \sqrt{(SE1^2 + SE2^2)}\}^2 \quad (8)$$

With the term SE1 that expresses the geometrical shadow effect, it is possible to obtain an effective expression of the angle-of-incidence property when the relief groove becomes deep, and with the term SE2 independent on the angle of incidence, it is possible to obtain an effective expression of diffraction efficiency in the vicinity of vertical incidence. With the angle arbitrary correction coefficients $k_1$ and $k_2$, it is possible to obtain results with quantitatively high precision.

(3)Drop of Energy Transmittance Due to Surface Reflection (FT)

To deal with reflection at the surface of a relief grating, assume that the slope surface of a blaze grating is of sufficient magnitude. From angles of incident light and zero-order diffractive light with respect to the normal to the slope surface, the transmission coefficient $C_t$ of the slope surface of the blaze grating is given in such a form as described below:

$$C_t = 2n_{en} \cos(\theta_{en} - \theta_b) \div \{n_{en}\cos(\theta_{en} - \theta_b) + n_{ex}\cos(\theta_{ex}^{(0)} - \theta_b)\} \quad (9)$$

where $\theta_b$ is a blaze angle. It is here to be understood that this holds of, for instance, when the electric field vector of the incident light is parallel with the grating groove (TE mode). From a comparison of the energy of the incident light with the energy of the m-order diffractive light on the basis of this result, an expression with respect to energy transmittance is given by $$FT = (n_{ex} \cos\theta_{ex}^{(m)} / n_{en} \cos\theta_{en}) \cdot |C_t|^2 \quad (10)$$

By the application of each of the above constructions to equation (2), approximate formula $\eta_m$ with respect to the transmission m-order diffraction efficiency can be obtained. It is here to be noted that the above expression includes arbitrary correction coefficients $k_1$ and $k_2$. For instance, these coefficients may be $$k_1 = 0.85 \quad (11)$$

$$k_2 = 0.3 \cdot |h/\lambda|^{0.35} \quad (12)$$

The same shall hold for all the following embodiments.

It is to be understood that the values of $k_1$ and $k_2$ indicated herein are to balance the precision of approximate formula $\eta_m$ against practically possible conditions. In other words, the values of $k_1$ and $k_2$ are not limited to these values, and so may be effectively determined depending on the conditions. While separate correction coefficients are determined with respect to SE1 and SE2, it is to be understood that a correction coefficient common to these may be determined.

To enhance the precision of approximate formula (2), however, it is preferable that correction coefficient $k_1$ is a constant while correction coefficient $k_2$ is a variable proportional to $(h/\lambda)$, as can be seen from equations (11) and (12).

Figure 4:
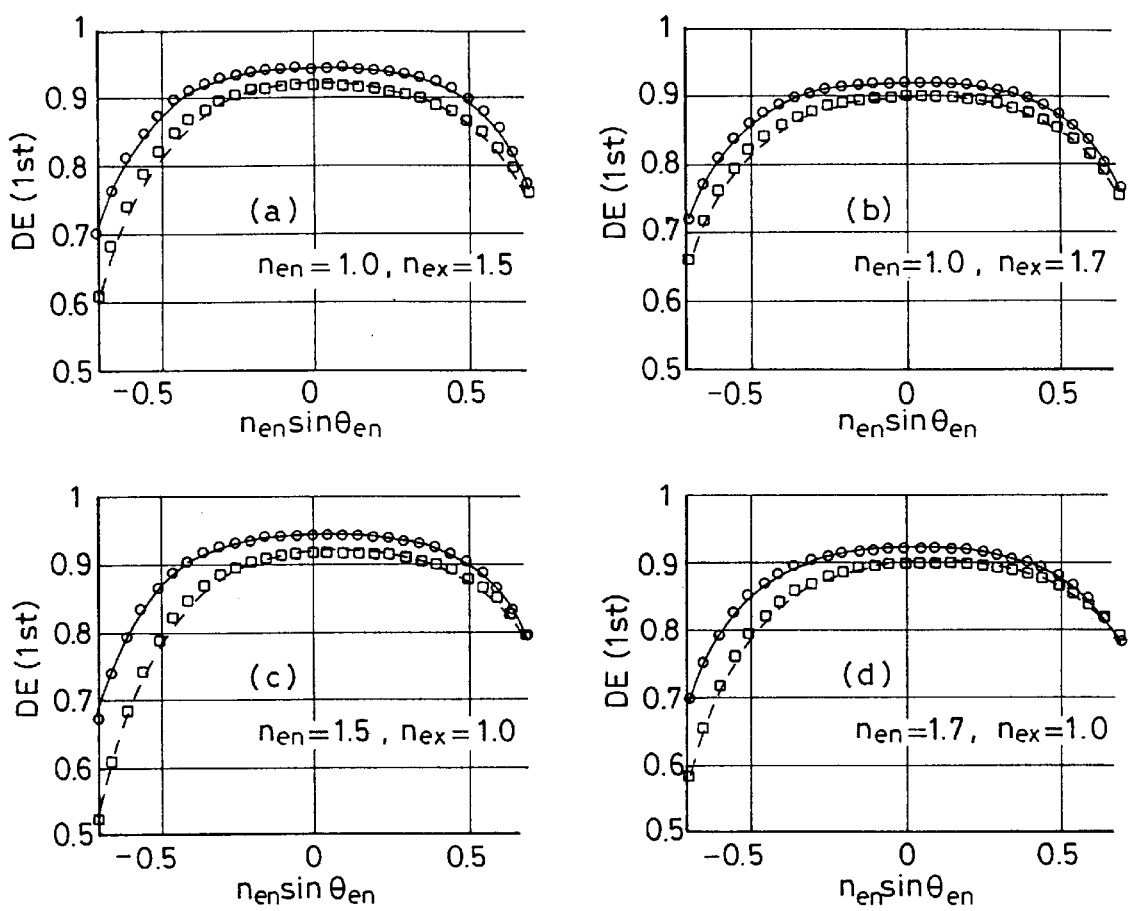
FIGS. 4(a), 4(b), 4(c) and 4(d) are graph representations for illustrating the results of calculation by the approximate expression of the invention and the results of stringent calculation on an electric field analysis basis when a relief is formed on the surface of an optical material.
Figure 5:
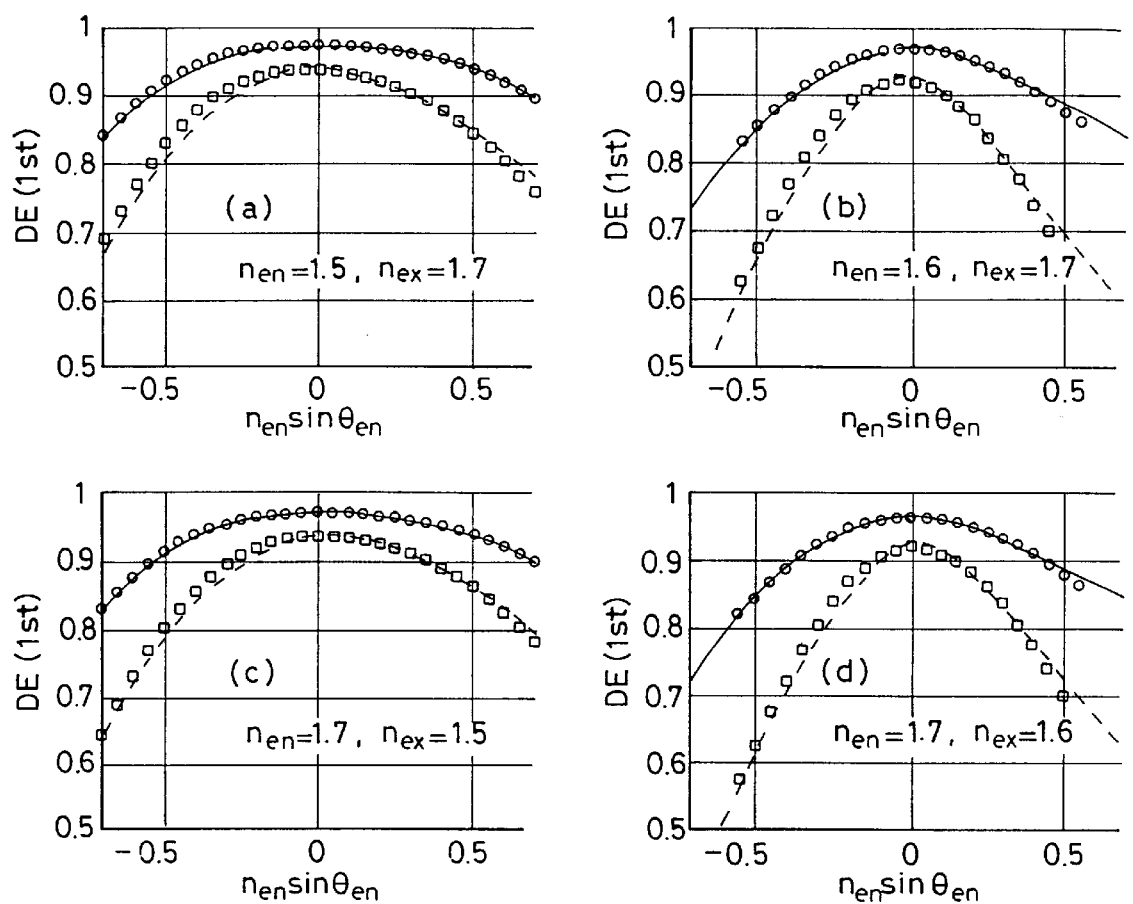
FIGS. 5(a), 5(b), 5(c) and 5(d) are graph representations similar to FIGS. 4(a), 4(b), 4(c) and 4(d) when a relief is formed across the boundary of two optical materials.

FIGS. 4 and 5 illustrate the results of calculation by the approximate formula according to the invention together with the results of stringent numerical calculation on an electric field analysis basis. Here, the groove depth h is determined such that the transmission first-order diffraction efficiency reaches a maximum on the basis of the thin model. In each figure, symbols ○ and □ show the results of stringent calculation of diffraction efficiency DE (○:p=50 [WL] and □:p=20 [WL] where WL is wavelength). Solid and broken lines show the results of calculation of diffraction efficiency DE by approximate formula (2) (solid line:p=50 [WL] and broken line:p=20 [WL] where WL is wavelength. FIG. 4 shows a simple case where a relief is merely formed on the surface of an optical material and one of media with the relief interleaved between them is an outside atmosphere (substantially air with a refractive index of 1), and FIG. 5 shows a case where a relief is formed across the boundary of two optical materials (the relief grating grooves are filled up with another optical material). From the results of these calculations, it is found that for practically possible combinations of entrance side media and exit side media, the results of calculation by the approximate formula of the invention are in good coincidence with the results of the stringent numerical calculation.

Figure 6:
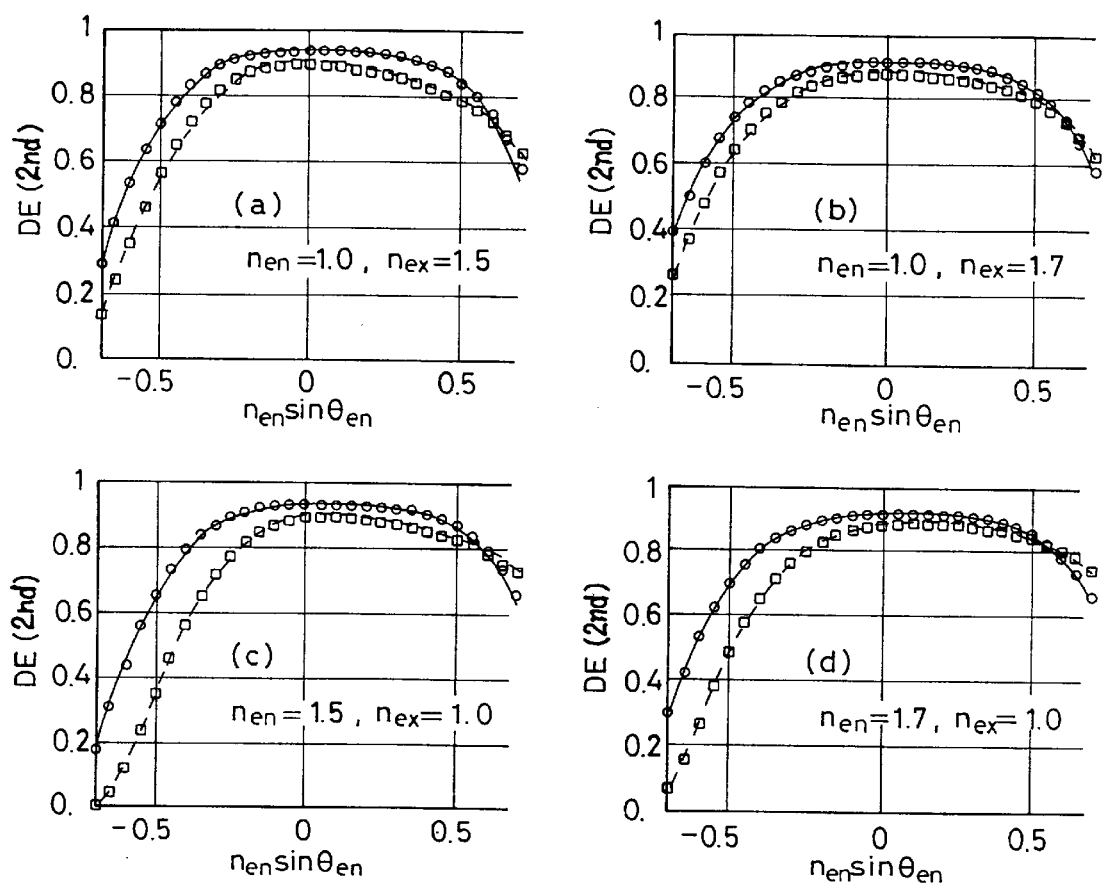
FIGS. 6(a), 6(b), 6(c) and 6(d) are graph representations similar to FIGS. 4(a), 4(b), 4(c) and 4(d) when groove depth is set such that the transmission secondary diffraction efficiency is maximized.

FIG. 6 shows the results of calculation when the groove depth h is determined such that the transmission second-order diffraction efficiency reaches a maximum. All conditions in FIG. 6, except that the groove depth h is twice as large, are the same as those in FIG. 4. As can be seen from FIG. 6, approximate formula (2) can quantitatively express well the angle-of-incidence dependence of diffraction efficiency even in the case where the second-order diffraction efficiency reaches a maximum.

As explained above, the present invention enables the diffraction efficiency of a transmission blaze grating to be quantitatively estimated in a simple manner because approximate formula (2) provides an accurate expression of the diffraction efficiency of the transmission blaze grating. Approximate formula (2) has the construction conforming to the physical action of a blaze grating, and so makes it possible to obtain the results of quantitatively accurate calculation of the diffraction efficiency of every practical blaze grating according to the invention. Therefore if this is used in combination with ray tracing, it is then possible to enhance the precision of an optical design for realizing a diffractive optical element in the form of a transmission blaze grating and improving the efficiency of developing the optical design. This in turn makes it possible to develop an optical system comprising a diffractive optical element higher in performance than achieved in the prior art.

Further, the inventors have found an estimation index EC as a criterion for determining practical conditions for constructing a transmission blaze grating from the standpoint of the angle-of-incidence dependence of diffraction efficiency, as described below:

$$EC = PSE \times SE \quad (13)$$

This index EC is a subtraction of factor FT given by equation (1) or the drop of diffraction efficiency due to the influence of reflection from the expression given by formula (2). Such an influence of reflection may be compensated for by the application of an antireflection coating, and so the nature inherent to a diffractive optical element can be effectively expressed by estimation index EC given by equation (13). This in turn enables an optical system comprising a more effective diffractive optical element to be developed.

In what follows, a detailed account will be given of the condition preferable for constructing a blaze grating to accomplish the second object of the invention while the angle-of-incidence dependence of diffraction efficiency is taken into consideration.

Here an index to the minimum condition to form a satisfactory image is assumed to be 80% diffraction efficiency. According to an article by D. A. Buralli et al. (APPL. OPT. 31, (1992) 4389), it is pointed out that unncessary light occurring with a drop of diffraction efficiency acts as background light to lower image contrast until MTF at zero spatial frequency decreases to a value of the order of diffraction efficiency. This teaches that the lowering of diffraction efficiency to 80% implies that MTF at zero spatial frequency drops to 80% and, at the same time, MTF drops with this value even in a region having a high spatial frequency. Although depending on applications where an optical system is used, it is generally believed that the optical system has not sufficient image formation capabilities on this level. From this, the 80% diffraction efficiency is regarded as an index to the formation of a satisfactory image.

It is here to be noted that the D. A. Buralli et al. argument is applied to the image formation capabilities of a single diffractive lens on the premise that the unnecessary light is uniformly distributed in an image plane. Accordingly, such an argument is not correct on a general optical system. However, this argument appears to be well grounded as an index to a full understanding of MTF degradation in the spatial frequency region of interest.

As already explained, the diffraction efficiency of the transmission blaze grating can be described in terms of estimation index EC that is given by equation (13) and expresses the nature inherent to a diffractive optical element, and factor FT or the drop of energy transmittance by surface reflection. Here, the drop of energy transmittance can be avoided by use of an antireflection coating, etc.; the above condition for the formation of a satisfactory image is achieved by determining the structure of the blaze grating in such a manner that estimation index EC exceeds 80%.

In order to form a satisfactory image by an image formation optical system comprising a transmission blaze grating, therefore, the optical system should be constructed in such a manner that the relationship between the angle of incidence of light on at least an entrance surface and the construction of a blaze grating in a region corresponding thereto satisfies the following condition (8) with respect to estimation index EC given by equation (13):

$$EC>80\% \qquad (14)$$

With this construction, at least 80% diffraction efficiency can be kept with respect to all ray bundles on at least the entrance surface, so that the optical system can have satisfactory image formation capabilities.

Figure 10:
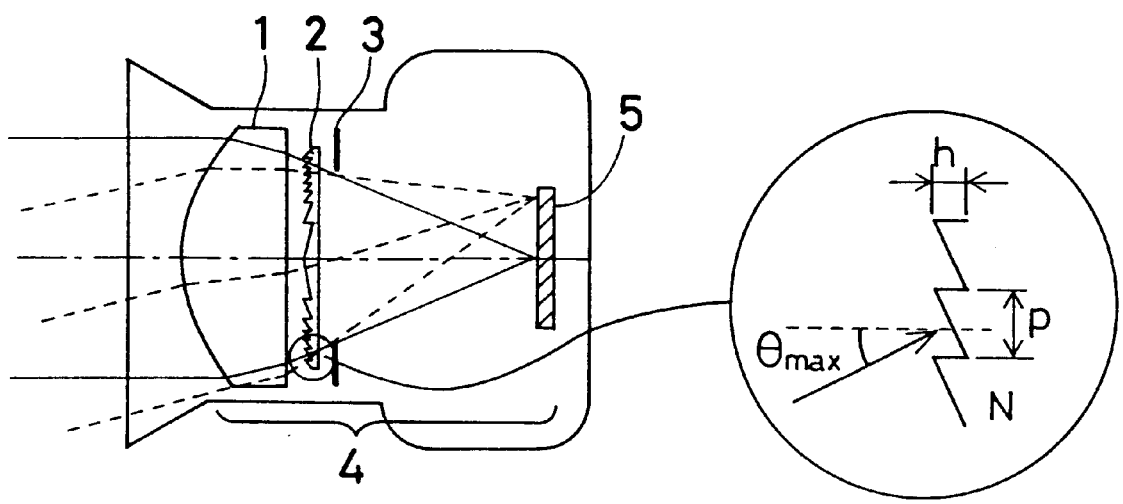
FIG. 10 is a conceptual rendering of the phototaking optical system of the invention.

FIG. 10 is a conceptual rendering of an phototaking optical system constructed as mentioned just above. A phototaking optical system 4 comprises a refractive lens 1, a diffractive lens 2, an aperture stop 3 and an image pickup means 5 for picking up an image of an object, all disposed on an optical axis. By optimizing this construction, aberrations of the phototaking optical system 4 are well corrected in a practically satisfactory range. The surface of diffractive lens 2 is shown on an enlarged scale in a circle on the right side in FIG. 10. As shown, the diffractive lens 2 is a transmission blaze grating constructed of an optically transparent material substrate with a refractive index N and a relief formed on the surface thereof with a sawtooth shape in section. The relief is made up of a concentric form of relief pattern so that the diffractive lens 2 can have a predetermined lens action. According to the invention, the relief has a groove depth h and a pitch p, and the lens action of diffractive lens 2 is balanced against the construction of phototaking optical system 4 in such a manner that the maximum angle of incidence $\theta_{max}$ of a light ray on the relief region satisfies condition (14) with respect to the refractive index N of the substrate. Thus, unnecessary light resulting from diffractive lens 2 can be effectively reduced so that the phototaking optical system can have high image formation capabilities. The present invention is particularly effective for an image formation optical system for forming an image of an object, wherein the influence of unnecessary light becomes a grave problem.

When an optical system comprises a photodetector member such as image pickup means 5 as in this embodiment, the wavelength λ of the light used may be any wavelength in a wavelength band to which the photodetector member is sensible. is evident that the higher the diffraction efficiency of a diffractive optical element, the more improved the image formation capabilities of an optical system comprising the diffractive optical element is. To achieve even higher image formation capabilities, it is thus preferable that the relationship between the relief structure and the above maximum angle of incidence is determined in such a manner that estimation index EC satisfies the following condition 15):

$$EC>90\% \qquad (15)$$

From detailed review of the results shown in FIGS. 4 and 5, it is found that when the sign of the angle-of-incidence is positive in an angle-of-incidence range where generally practical diffraction efficiency is achieved, the diffraction efficiency is less dependent on the angle-of-incidence. According to what is implied by estimation index EC given by condition (13), the case where the sign of the angle-of-incidence coincides with the sign of the order of diffraction is generally characterized in that the angle-of-incidence dependence is reduced. For an optical system constructed as mentioned above, it is practically effective to locate the angle-of-incidence in the direction satisfying this condition (or in the direction in which the sign of the angle-of incidence coincides with the sign of the order of diffraction). In other words, it is desired for an optical system comprising a blaze grating that the signs of the angles of incidence of all chief rays on the entrance surface of the blaze grating be in coincidence with the sign of the m-order of diffraction at which the maximum diffraction efficiency is obtained. With this arrangement, the angle-of-incidence of diffraction efficiency is reduced while high diffraction efficiency is maintained, so that the optical system can have ever higher performance.

It is here to be noted that a phenomenon wherein the angle-of-incidence dependence of diffraction efficiency becomes asymmetric, for the most part, is ascribable to the effect of phase shift action given by equation (4). According to what is implied by estimation index EC given by equation (13), the effect prevails when there is large difference in refractive index between the entrance side and the exit side. For the above arrangement constructed on the assumption that practical optical materials are used, it is preferable that the media on the entrance and exit sides are determined in such a manner that the following condition (16) is satisfied:

$$5>|n_{ex}-n_{en}|>0.5 \qquad (16)$$

From FIG. 6 it is evident that the angle-of-incidence dependence of diffraction efficiency becomes worse with an increase in the order of diffraction m where the maximum diffraction efficiency is obtained. To make effective use of an diffractive optical element in a wider range of specifications, it is thus desired that the order of diffraction m used satisfy the following condition (17):

$$|m|=1 \qquad (17)$$

With this arrangement, it is possible to widen the range of application of a diffractive optical element to an optical system and, hence, achieve an ever higher-performance optical system, because it is possible to use the +first-order or −first-order diffracted light where the angle-of-incidence dependence of diffraction efficiency is minimized.

Figure 11:
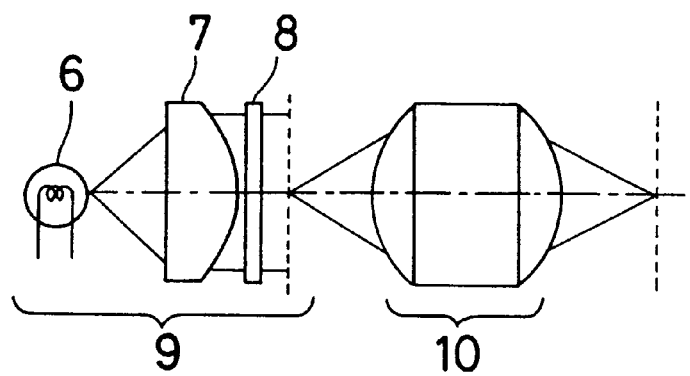
FIG. 11 is a conceptual rendering of the optical system of the invention wherein a light source is incorporated.

FIG. 11 is a conceptual rendering of the optical system of the invention wherein a light source is incorporated. In FIG. 11, an illumination optical system 9 comprises a light source 6, a condenser lens 7 and a band-pass filter 8, and illuminates the surface of a sample. Reference numeral 10 stands for an image formation optical system for forming an image of the sample. The image formation optical system 10 has a transmission blaze grating therein, and the construction of the blaze grating and the angle of incidence of a light ray thereon satisfy the aforesaid predetermined condition according to the invention. When the optical system of the invention comprises a light source as in this embodiment, the wavelength λ of the light used may be any wavelength in a wavelength band of light emitted from the light source. When the optical system of the invention comprises a band-pass filter as in this embodiment, the wavelength λ of the light used may be any wavelength in a wavelength band of light which transmits through the band-pass filter.

For the optical system of the invention as explained above, it is effective that the wavelength λ of the light used is substantially a center wavelength in a wavelength band of light that transmits substantially through the optical system. By selecting the wavelength λ of the light used, it is thus possible to obtain a satisfactory image in a wide wavelength region in a wavelength range of substantially usable light.

Next, the structure of the blaze grating used to accomplish the second object of the invention will be explained.

Figure 7:
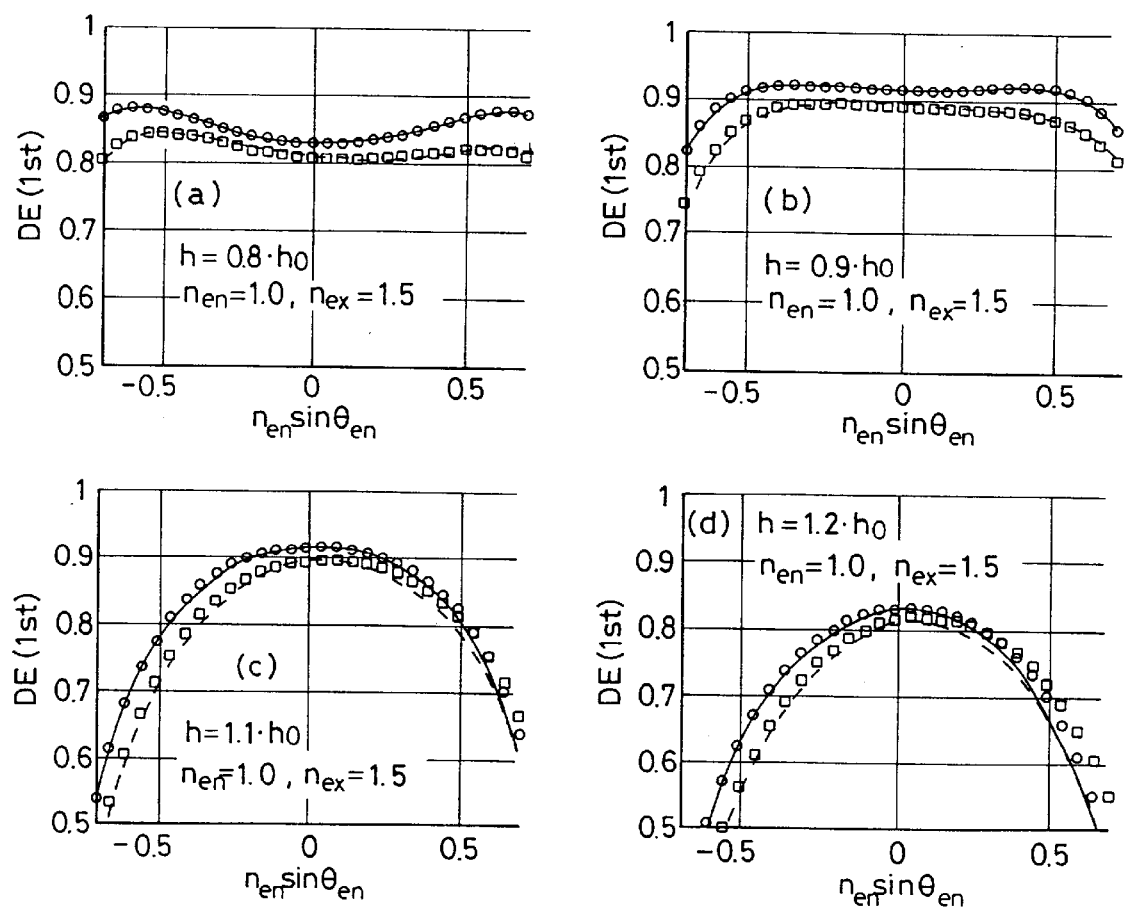
FIGS. 7(a), 7(b), 7(c) and 7(d) are graph representations for illustrating the relationship between the groove depth of the blaze grating and the angle-of-incidence dependence of diffraction efficiency.

FIG. 7 illustrates the relationship between blaze grating groove depths h and the angle-of-incidence dependence of diffraction efficiency. The groove depths h in FIGS. 7($a$), 7($b$), 7($c$) and 7($d$) are determined such that $h=0.8 \cdot h_0$, $h=0.9 \cdot h_0$, $h=1.1 \cdot h_0$, and $h=1.2 \cdot h_0$ where $h_0$ is the optimum value of transmission first-order diffractive light found on an ordinary thin model base or $$h_0 = \lambda/(n_{ex} - n_{en}) \tag{18}$$

The refractive indices of the entrance and exit sides, too, are determined such that $n_{en}=1.0$ and $n_{ex}=1.5$, respectively. As in FIGS. 4 to 6, symbols ○ and □ show the results of stringent calculation (○:p=50 [WL] where WL is wavelength, and □:p=20 [WL]), and solid and broken lines show the results found by approximate formula (2) (solid line:p=50 [WL], and broken line:p=20 [WL]).

As can be seen from FIG. 7, if a slight lowering of diffraction efficiency in the vicinity of vertical incidence is within allowable limits, it is then possible to make the blaze grating groove depth h smaller than the optimum value found on a thin model basis, thereby improving the angle-of-incidence dependence of diffraction efficiency. By detailed examination of what is implied by the aforesaid estimation index EC, the inventors have found that the angle-of-incidence dependence of diffraction efficiency is improved by permitting the construction of a blaze grating to satisfy the following conditions (19) and (20):

$$0.8 < |h/h_0| < 1 \tag{19}$$

$$6 < |p/h_0| \tag{20}$$

By satisfying these conditions, it is thus possible to keep the diffraction efficiency needed to form satisfactory images in a wide angle-of-incidence range.

Figure 8:
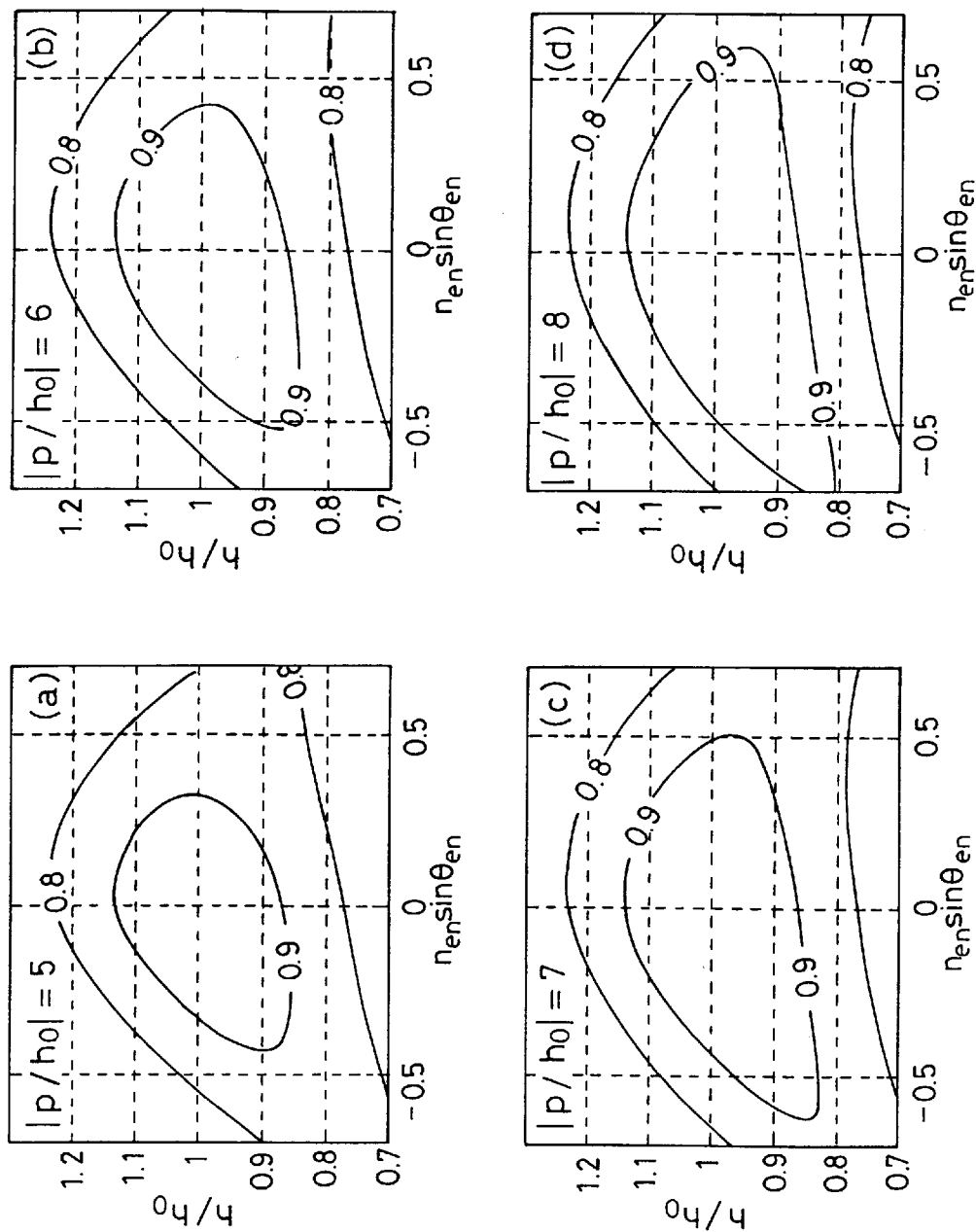
FIGS. 8(a), 8(b), 8(c) and 8(d) are representations in which contours lines at which an estimation index EC for first-order diffracted light is 80%, and 90% are drawn using the angle of incidence and the groove depth as parameters.
Figure 9:
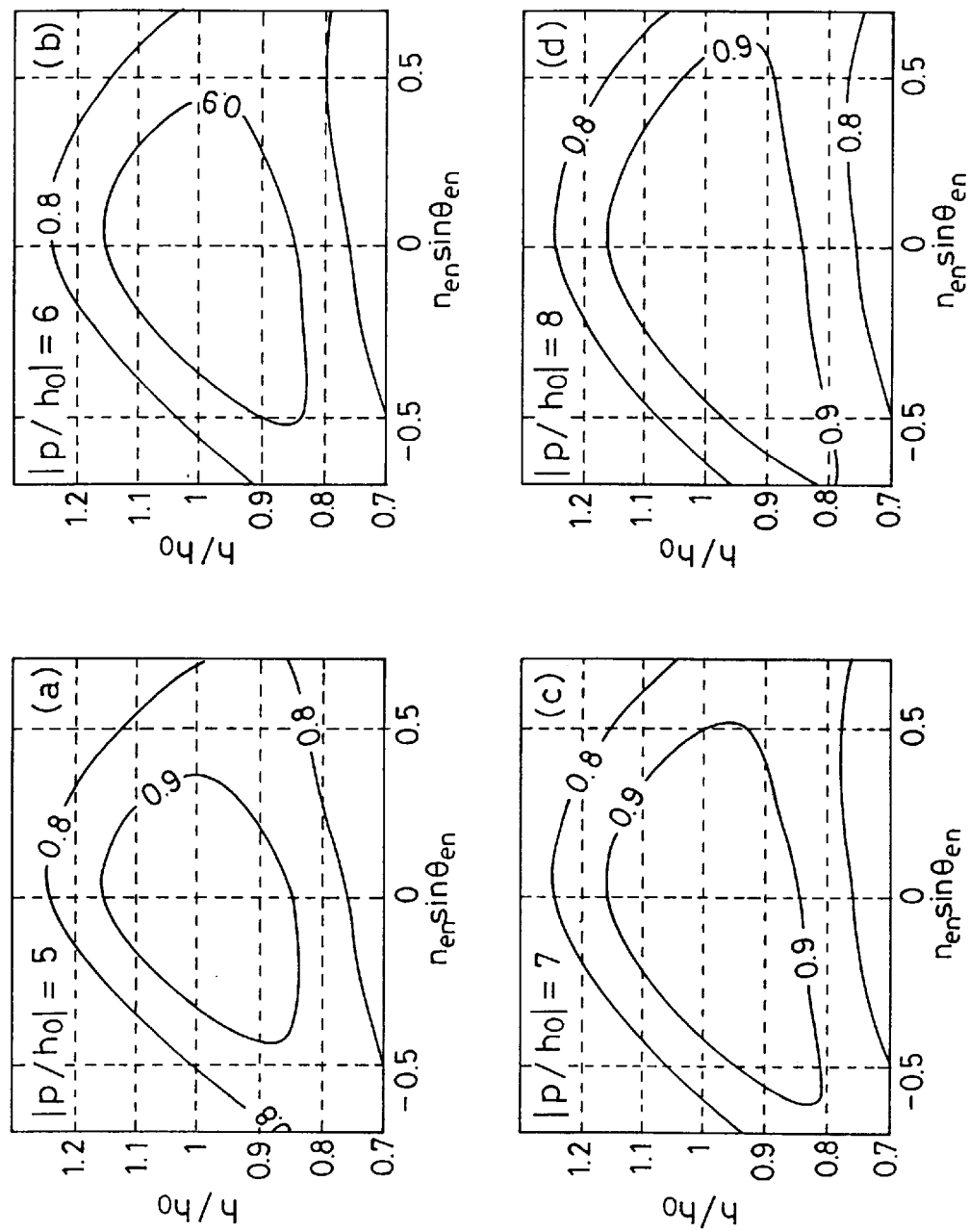
FIGS. 9(a), 9(b), 9(c) and 9(d) are representations similar to FIGS. 8(a), 8(b), 8(c) and 8(d).

In FIGS. 8 and 9, contour lines at which m=1, i.e., estimation index EC is 80% and 90% with respect to first-order diffracted light are drawn using the angle of incidence and the groove depths as parameters. In FIG. 8 the contour lines are drawn at a pitch p=20 [WL], and in FIG. 9 the contour lines are drawn at a pitch p=50 [WL]. In FIGS. 8($a$), 8($b$), 8($c$) and 8($d$), and FIGS. 9($a$), 9($b$), 9($c$) and 9($d$), $|p/h_0|$ is 5, 6, 7 and 8, respectively. Here the refractive indices of the entrance and exit sides are assumed to be $n_{en}=1.3$ and $n_{ex}>n_{en}$, respectively. However, this assumption has little or no influence on the angle-of-incidence dependence. As can be seen from FIGS. 8 and 9, unless the construction of the blaze grating satisfies condition (20), the angle-of-incidence dependence of diffraction efficiency then becomes worse when the sign of the angle of incidence is positive, and unless condition (19) is satisfied, there is then a drastic reduction in the angle-of-incidence range where the diffraction efficiency needed to form satisfactory images is achievable.

From FIGS. 8 and 9 it is also found that the angle-of-incidence dependence of diffraction efficiency of the above construction is improved when the angle of incidence is negative, and generally when the angle of incidence and the order of diffraction m are of opposite sign. For an optical system comprising the blaze grating constructed as mentioned above, it is thus preferable that the signs of all chief rays incident on the entrance surface of the blaze grating are opposite to the sign of the order of diffraction m at which the diffraction efficiency reaches a maximum. With this construction, it is possible to keep the angle-of-incidence of diffraction efficiency low as a whole and, hence, achieve an ever higher-performance optical system.

For the constructions of the blaze grating and optical system as explained above, it is possible to arbitrarily select the wavelength λ of the light used from the following range:

$$0.4 \, \mu m < \lambda < 10 \, \mu m \tag{21}$$

Alternatively, the wavelength λ may arbitrarily be selected from a range of wavelength substantially transparent to the entire optical system. Especially when satisfactory image characteristics are obtained in a white image formation optical system, however, it is effective to select the wavelength λ from the following range:

$$0.45 \, \mu m < \lambda < 0.55 \, \mu m \tag{22}$$

By selecting the wavelength λ from this range, it is possible to satisfactorily keep the angle-of-incidence dependence of diffraction efficiency in a wide range of wavelengths taking part in the formation of white images.

Figure 12:
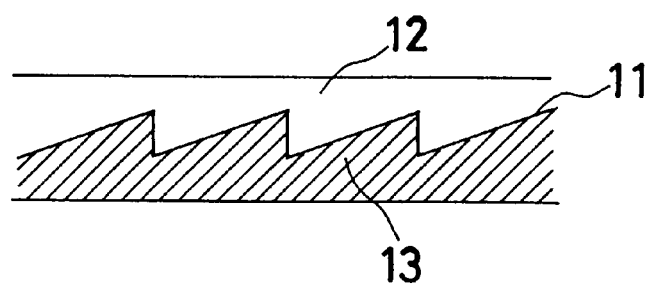
FIG. 12 is a sectional schematic of a blaze grating formed on the surface of the boundary of two different optical materials.

It is here to be noted that the blaze grating of the invention or the blaze grating used with the optical system of the invention is advantageously formed on the surface of the boundary of two different optical materials, as shown in FIG. 12 wherein reference numeral 11 represents the contour of a section of the blaze grating, 12 a first optical material, and 13 a second optical material. In general, a blaze grating having such a layer structure has deep relief grooves and narrow allowable limits to oblique incidence. With the arrangement of the invention, however, it is possible to obtain satisfactory images less susceptible to deterioration due to unnecessary light. It is also possible to effectively prevent contamination of the surface of a relief pattern with fingerprints, etc., thereby enabling such optical design as to expose the relief pattern surface substantially to the outside. This in turn makes it possible to enlarge the range of application of a diffractive optical element and, hence, provide an ever higher-performance optical system.

According to the optical system comprising the diffractive optical element of the invention and the method of designing the optical system, the estimation index is given by a predetermined mathematical expression including at least a phase difference due to relief discontinuities and shadow effects thereof. The mathematical expression includes as the shadow effects of the discontinuities at least a light attenuation effect dependent on an angle-of-incidence and a light attenuation effect independent on the angle-of-incidence in a separate manner. It is thus possible to provide a quantitatively accurate calculation of the diffraction efficiency of a transmission blaze grating. By using this in combination with ray tracing, it is possible to improve the accuracy of optical design for achieving a diffractive optical element in the form of a transmission blaze grating and the efficiency of development thereof and, hence, develop a diffractive optical element-including optical system having ever higher performance than achieved in the prior art.

What is claimed is:

1. An optical system, characterized by comprising a transmission blaze grating constructed of a relief having a sawtooth shape in section and satisfying the following relationships:

$$0.8 < |h/h_0| < 1$$

$$6 < |p/h_0|$$

where $h_0 = \lambda/(n_{ex} - n_{en})$, $\lambda$ is a wavelength of light used, $n_{en}$ is a refractive index of an entrance side medium, $n_{ex}$ is a refractive index of an exit side medium, h is a grating groove depth, and p is a grating pitch.

2. The optical system according to claim 1, wherein a sign of an angle $\theta_{en}$ of incidence of all chief rays on an entrance surface upon incidence on said transmission blaze grating with respect to a normal to a grating surface coincides with a sign of an order of diffraction m at which diffraction efficiency is maximized.

* * * * *